United States Patent
Zhang et al.

(10) Patent No.: US 9,329,399 B2
(45) Date of Patent: May 3, 2016

(54) NAKED-EYE THREE-DIMENSIONAL IMAGE DISPLAY METHOD AND DEVICE

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Junrui Zhang, Beijing (CN); Junhwan Lim, Beijing (CN); Yuanming Feng, Beijing (CN); Bo Shi, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 519 days.

(21) Appl. No.: 13/805,038

(22) PCT Filed: Oct. 24, 2012

(86) PCT No.: PCT/CN2012/083450
§ 371 (c)(1),
(2) Date: Dec. 18, 2012

(87) PCT Pub. No.: WO2013/060273
PCT Pub. Date: May 2, 2013

(65) Prior Publication Data
US 2014/0063381 A1    Mar. 6, 2014

(30) Foreign Application Priority Data

Oct. 25, 2011   (CN) .......................... 2011 1 0328417

(51) Int. Cl.
*G02F 1/1335*   (2006.01)
*G02B 27/22*   (2006.01)
(Continued)

(52) U.S. Cl.
CPC ........ *G02B 27/225* (2013.01); *G02F 1/133526* (2013.01); *H04N 13/0409* (2013.01); *H04N13/0497* (2013.01); *G02F 1/1347* (2013.01); *G02F 2001/294* (2013.01); *G09G 3/003* (2013.01)

(58) Field of Classification Search
USPC .......................................... 349/15
See application file for complete search history.

(56) References Cited

U.S. PATENT DOCUMENTS 4,579,424 A * 4/1986 Matsukawa et al. .......... 349/108
6,356,331 B1 * 3/2002 Ono et al. ..................... 349/141
(Continued)

FOREIGN PATENT DOCUMENTS

CN    101446717 A   6/2009
CN    101526702 A   9/2009
(Continued)

OTHER PUBLICATIONS

Machine Translation of CN 101655608 A.*
(Continued)

*Primary Examiner* — Lucy Chien
(74) *Attorney, Agent, or Firm* — Ladas & Parry LLP

(57) ABSTRACT

Embodiments of the present invention disclose a naked-eye three-dimensional image display method and device, and the naked-eye three-dimensional image display method comprises: with a control means, making a two-dimensional display screen display a left-eye image at a first moment, and synchronously applying a first set of voltages to a liquid crystal lens located at a light-exiting side of the two-dimensional display screen, so that the left-eye image is projected through the liquid crystal lens to a left eye of an observer; and with the control means, making the two-dimensional display screen display a right-eye image at a second moment, and synchronously applying a second set of voltages to the liquid crystal lens, so that the right-eye image is projected through the liquid crystal lens to a right eye of the observer; wherein a time interval between the first moment and the second moment is not more than visual persistence time of human eyes.

20 Claims, 4 Drawing Sheets

(51) Int. Cl.
  *H04N 13/04* (2006.01)
  *G09G 3/00* (2006.01)
  *G02F 1/1347* (2006.01)
  *G02F 1/29* (2006.01)

(56) References Cited

U.S. PATENT DOCUMENTS

| 6,542,209 B2 | 4/2003 | Kim et al. |
| 7,515,213 B2 | 4/2009 | Aramatsu |
| 2011/0025675 A1 | 2/2011 | Peng et al. |
| 2012/0120333 A1 | 5/2012 | Chen et al. |
| 2014/0063381 A1 | 3/2014 | Zhang et al. |

FOREIGN PATENT DOCUMENTS

| CN | 101655608 A | 2/2010 |
| CN | 101900887 A | 12/2010 |
| CN | 102062985 A | 5/2011 |
| CN | 102629009 A | 8/2012 |
| WO | 2011/088615 A1 | 7/2011 |

OTHER PUBLICATIONS

First Chinese Office Action dated Nov. 22, 2012; Appln. No. 201110328417.7.

International Search Report mailed Jan. 31, 2013; PCT/CN2012/083450.

Written Opinion of the International Searching Authority mailed Jan. 31, 2013; PCT/CN2012/083450.

Second Chinese Office Action dated Feb. 6, 2013; Appln. No. 201110328417.7.

Chinese Rejection Decision dated May 15, 2013; Appln. No. 201110328417.7.

International Preliminary Report on Patentability issued Apr. 29, 2014; PCT/2012/083450.

* cited by examiner

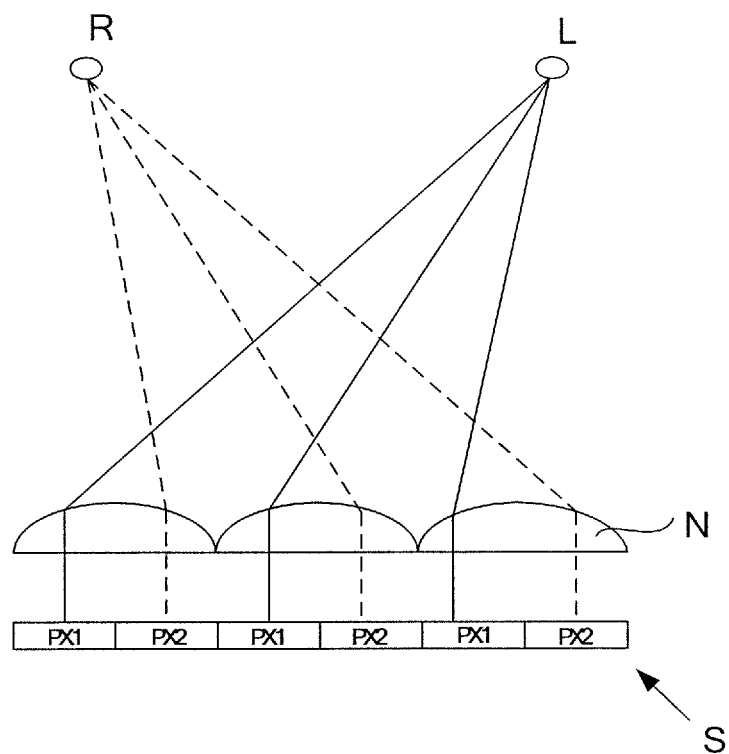
FIG..1
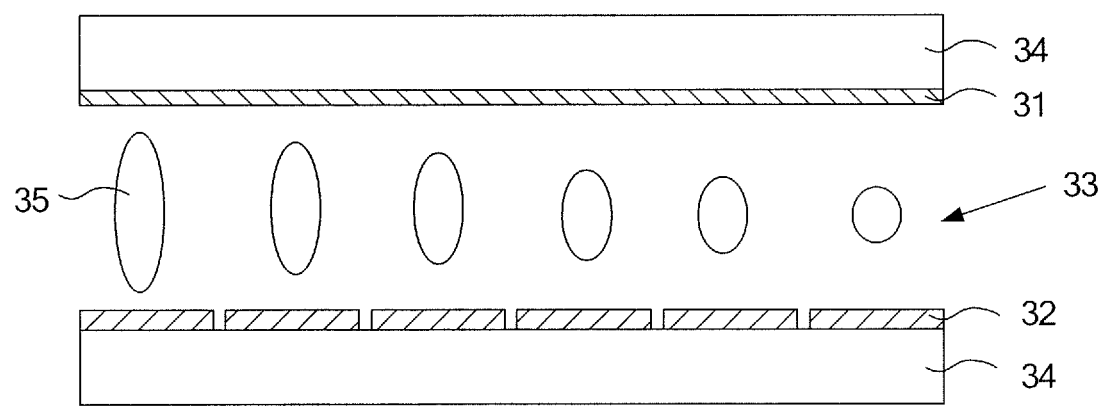
FIG.2

NAKED-EYE THREE-DIMENSIONAL IMAGE DISPLAY METHOD AND DEVICE

TECHNICAL FIELD

Embodiments of the present invention relate to a naked-eye three-dimensional image display method and device.

BACKGROUND

With a wide range of applications of three-dimensional (3D) display technology, televisions, mobile phones, game consoles and other electronic products all begin to possess a 3D display function additionally. The 3D display technology is mainly divided into two types: a naked-eye-type 3D display technology and a glasses-type 3D display technology.

The glasses-type 3D display technology has an advantage of not reducing resolution; however, to see a 3D image, it requires wearing a pair of special glasses, and the special glasses are relatively expensive; therefore, the glasses-type 3D display technology has a relatively high cost and less convenience. The naked-eye-type 3D display technology makes a 3D image can be seen without wearing a pair of special glasses additionally; therefore, it can significantly improve convenience, and thus gains wide concerns at present.

The naked-eye-type 3D display technology is mainly divided into two types: a barrier type and a lens type.

The principle of an existing lens-type 3D display technology is as shown in FIG. 1, and a 2D (two-dimensional) display screen S is used for displaying a two-dimensional image. In the figure, adjacent two pixels PX1 and PX2 display a left-eye image and a right-eye image, respectively, at a same moment; light (shown as solid lines) emitted from the PX1 is sent to a left eye L after passing though a lens N at a light-exiting side of the pixel, while light (shown as broken lines) emitted from the PX2 is sent to a right eye R after passing though the lens N at the light-exiting side of the pixel; because the left-eye image and the right-eye image are a pair of images with parallax therebetween, a 3D image can be formed in human eyes.

In the process of using the above-mentioned lens-type 3D display technology to display a 3D image, since different pixels have to be used for displaying images viewed by left and right eyes at a same moment, a lens-type 3D display produced by using the above-described lens-type 3D display technology will incur reduced resolution.

SUMMARY

Embodiments of the present invention provide a naked-eye three-dimensional image display method and device, which can suppress resolution reduction of a lens-type 3D display.

In one aspect of the present invention, there is provided a naked-eye three-dimensional image display method, comprising: with a control means, making a two-dimensional display screen display a left-eye image at a first moment, and synchronously applying a first set of voltages to a liquid crystal lens located at a light-exiting side of the two-dimensional display screen, so that the left-eye image is projected through the liquid crystal lens to a left eye of an observer; and with the control means, making the two-dimensional display screen display a right-eye image at a second moment, and synchronously applying a second set of voltages to the liquid crystal lens, so that the right-eye image is projected through the liquid crystal lens to a right eye of the observer; wherein a time interval between the first moment and the second moment is not more than visual persistence time of human eyes.

In another aspect of the present invention, there is provided a naked-eye three-dimensional image display device, comprising: a display screen, for displaying a two-dimensional image; a control means; and a liquid crystal lens, located at a light-exiting side of the display screen; wherein the control means is adapted for making the display screen display a left-eye image at a first moment, and synchronously applying a first set of voltages to the liquid crystal lens, so that the left-eye image is projected through the liquid crystal lens to a left eye of an observer; the control means is further adapted for making the display screen display a right-eye image at a second moment, and synchronously applying a second set of voltages to the liquid crystal lens, so that the right-eye image is projected through the liquid crystal lens to a right eye of the observer; and a time interval between the first moment and the second moment is not more than visual persistence time of human eyes.

In the naked-eye three-dimensional image display method and device provide by the embodiments of the present invention, because all pixels on a two-dimensional display screen are used to display a left-eye image or a right-eye image at a same moment, without using different pixels to display images viewed by left and right eyes, resolution reduction of a lens-type 3D display can be avoided.

BRIEF DESCRIPTION OF THE DRAWINGS

In order to clearly illustrate the technical solutions in the embodiments of the invention or in the prior art, the drawings needed in the description of the embodiments or the prior art will be briefly described in the following; it is obvious that the described drawings are only related to some embodiments of the invention. Based on these drawings, the ordinary skilled in the art can obtain other drawing(s), without any inventive work.

FIG. 1 is a diagram showing a display principle of an existing lens-type 3D display technology;

FIG. 2 is a schematic sectional view of an exemplary structure of a liquid crystal lens in a first embodiment of the present invention;

DETAILED DESCRIPTION

Figure 3A:
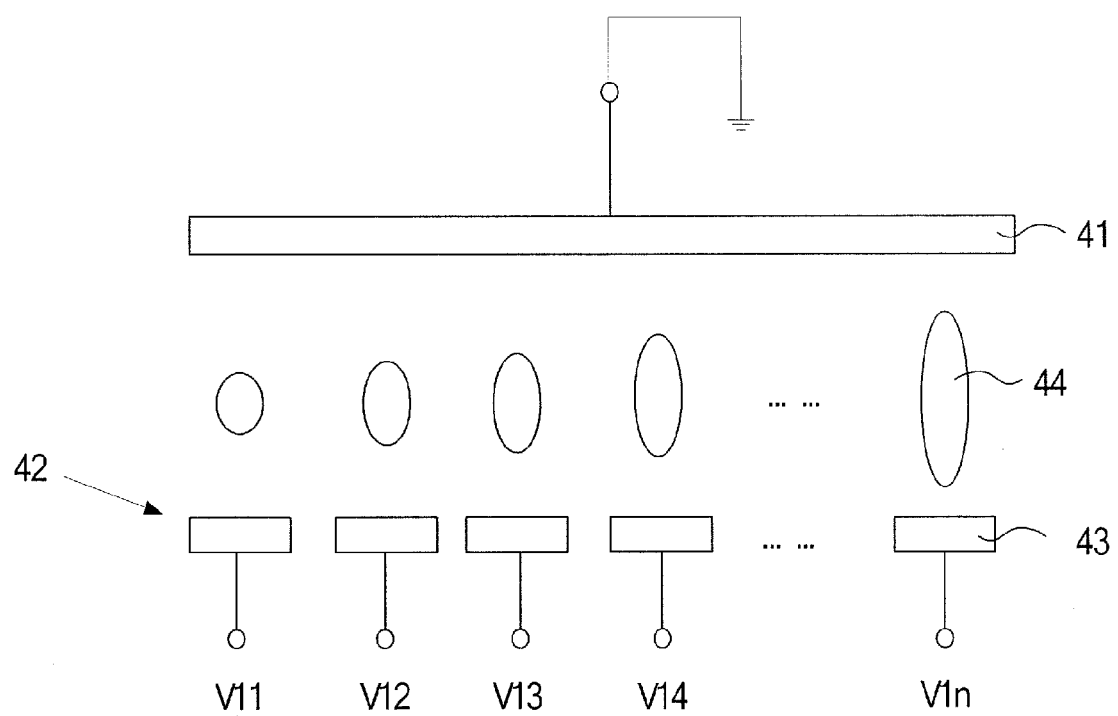
FIGS. 3a-3b are diagrams showing a principle of displaying a left-eye image in the first embodiment of the present invention.

An embodiment of the present invention provides a naked-eye three-dimensional image display method, comprising: with a control means, making a two-dimensional display screen display a left-eye image at a first moment, and synchronously applying a first set of voltages to a liquid crystal lens located at a light-exiting side of the two-dimensional display screen, so that the left-eye image is projected through the liquid crystal lens to a left eye of an observer; with the control means, making the two-dimensional display screen display a right-eye image at a second moment, and synchronously applying a second set of voltages to the liquid crystal lens, so that the right-eye image is projected through the liquid crystal lens to a right eye of the observer; and a time interval between the first moment and the second moment is not more than visual persistence time of human eyes.

An embodiment of the present invention also provides a naked-eye three-dimensional image display device, comprising: a two-dimensional display screen for displaying a two-dimensional image, a control means, and a liquid crystal lens located at a light-exiting side of the two-dimensional display screen; wherein the control means is adapted for making the two-dimensional display screen display a left-eye image at a first moment, and synchronously applying a first set of voltages to the liquid crystal lens, so that the left-eye image is projected through the liquid crystal lens to a left eye of an observer; the control means is further adapted for making the two-dimensional display screen display a right-eye image at a second moment, and synchronously applying a second set of voltages to the liquid crystal lens, so that the right-eye image is projected through the liquid crystal lens to a right eye of the observer; a time interval between the first moment and the second moment is not more than visual persistence time of human eyes.

In the naked-eye three-dimensional image display method and device provide by the embodiments of the present invention, because all pixels on a two-dimensional display screen are used to display a left-eye image or a right-eye image at a same moment, without using different pixels to display images viewed by left and right eyes, resolution reduction of a lens-type 3D display can be avoided.

Below, the technical solutions in the embodiments of the invention will be described in a clearly and fully understandable way in connection with the drawings related to the embodiments of the invention. It is obvious that the described embodiments are just a part but not all of the embodiments of the invention. Based on the embodiments herein, those skilled in the art can obtain other embodiment(s), without any inventive work, which should be within the scope of the invention.

First Embodiment

This embodiment provides a naked-eye three-dimensional image display method, and the method will be described in detail as follows with reference to FIG. 2, FIGS. 3a-3b and FIGS. 4a-4b.

Step 1: with a control means, making a two-dimensional display screen display a left-eye image at a first moment, and synchronously applying a first set of voltages to a liquid crystal lens located at a light-exiting side of the two-dimensional display screen, so that the left-eye image is projected through the liquid crystal lens to a left eye of an observer.

Specifically, as shown in FIG. 2, the liquid crystal lens may be an electrically-controlled lens, which comprises: a first transparent electrode 31, a second transparent electrode 32, and a liquid crystal layer 33 sandwiched between the two transparent electrodes, as well as substrates 34 adhered to surfaces of the transparent electrodes which are not in contact with the liquid crystal layer 33. The liquid crystal lens utilizes the characteristic that liquid crystal molecules 35 can rotate about axes under the effect of an electric field, with a voltage being applied between the two transparent electrodes to form an electric field in the liquid crystal layer 33, thereby the rotation angles of the liquid crystal molecules 35 can be controlled, and thus the refractive indices of the liquid crystal lens can be changed. The first transparent electrode 31 is in a shape of a continuous sheet, and the second transparent electrode 32 is a patterned transparent electrode composed of a plurality of mutually electrically-insulated electrode patterns; in order to make the liquid crystal lens have different refractive indices along an extending direction of the substrates 34, different voltages are required to be applied between the first transparent electrode 31 and each of the electrode patterns of the second transparent electrode 32, so that vertical electric fields with different electric-field intensities are formed between the first transparent electrode 31 and each of the electrode patterns, and thus corresponding liquid crystal molecules 35 along the extending direction of the substrates 34 have different rotation angles as shown in FIG. 2. The substrates 34 may be glass substrates, also may be other transparent substrates such as plastic substrates.

As an alternative, the transparent electrodes also may be only formed on one of the two substrates, and the transparent electrodes are patterned transparent electrodes, which may have the same shape as the second transparent electrode 32 shown in FIG. 2, that is, may composed of a plurality of mutually electrically-insulated electrode patterns. By applying different voltages between the electrode patterns, horizontal electric fields with different electric-field intensities can be formed between the electrode patterns, and thus corresponding liquid crystal molecules along the extending direction of the substrates have different rotation angles.

As an alternative, the liquid crystal lens also may have a structure as follows: an upper substrate; a lower substrate, opposite to the upper substrate; a liquid crystal layer, sandwiched between the upper substrate and the lower substrate; a first transparent electrode and a second transparent electrode, formed on a surface of the upper substrate opposite to the lower substrate; an insulating layer, formed between the first transparent electrode and the second transparent electrode; wherein in the first transparent electrode and the second transparent electrode, the first transparent electrode, which is farther away from the liquid crystal layer, is formed as a continuous sheet, while the second transparent electrode is formed to have mutually electrically-insulated stripe-like patterns; wherein the first transparent electrode may be grounded, while each of the strip-like patterns of the second transparent electrode may be applied with different voltages, so that horizontal and vertical electric fields with different electric-field intensities can be generated along the extending direction of the two substrates, and thus corresponding liquid crystal molecules along the extending direction of the substrates have different rotation angles.

Certainly, the structure of a liquid crystal lens is not limited to any of the above-described structures, and may be other structures known to those skilled in the art, in which the refractive index in each part can be changed by varying the voltages applied to the transparent electrodes.

Below, with the structure of the liquid crystal lens shown in FIG. 2 as an example, a detailed description of Step 1 will be given. Those skilled in the art should understand that, the following detailed description is equally applicable to other structure of the liquid crystal lens, and can be appropriately modified for enabling realization.

Figure 3B:
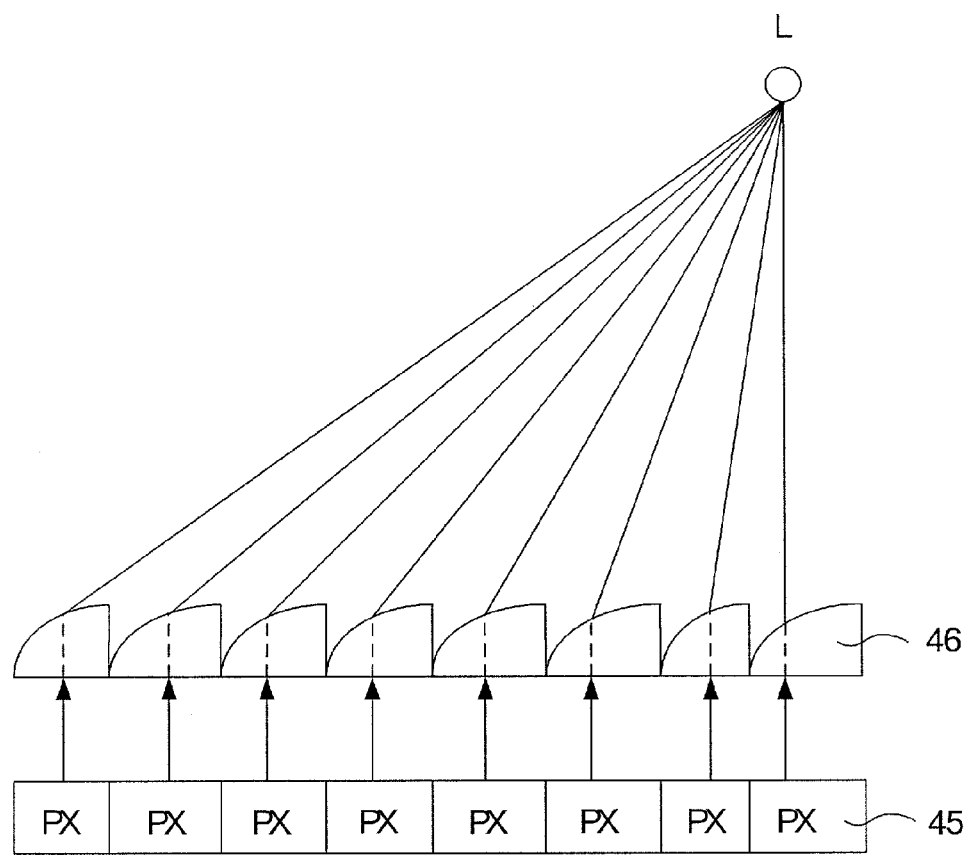

In this embodiment, as shown in FIG. 3a and FIG. 3b, a control means (not shown in the figures) is used to apply a first set of voltages $V11, V12, \ldots V1n$ to the liquid crystal lens, that is, apply the voltages between the first transparent electrode 41 and each of the electrode patterns 43 of the second transparent electrode 42 of the liquid crystal lens, at a first moment; the first transparent electrode 41 is a common electrode and can be grounded, and each voltage in the first set of voltages $V11, V12, \ldots V1n$ is applied to each of the electrode patterns 43, respectively. As an example, the voltages $V11 \ldots V1n$ are generally in the range 0-7V, decreasing sequentially from $V11$ to $V1n$. In this embodiment, as an example, assuming that the electrode patterns of the second transparent electrode in each pixel region are divided into five sections, corresponding to five different voltages, that is, n=5; therefore, it may be set as: V11=7V, V12=5V, V13=3.5V, V14=2V, V15=0V, for example. At this time, by controlling the magnitudes of the voltages applied to each of the electrode patterns 43, the rotation angles of the liquid crystal molecules 44 in the effect of the electric fields can be controlled, so that the light emitted by each of the pixels PX of the two-dimensional display screen 45 in FIG. 4b is refracted upon passing through the liquid crystal lens 46 and then enters into an observer's left eye L.

It should be noted that, the magnitudes of the voltages applied to different electrode sections can be adjusted according to characteristics of an actual liquid crystal lens, as long as the distribution of the refractive indices of the liquid crystal is ensured to meet the requirements of the lens.

Since at this time a left-eye image is displayed synchronously on the two-dimensional display screen 45, the left-eye image displayed on the two-dimensional display screen 45 is projected through the liquid crystal lens 46 to the left eye L of the observer. In FIG. 3b, the liquid crystal lens 46 applied with the first set of voltages V11, V12, . . . V1n has refractive indices that increase sequentially from left to right, and according to the changes of the refractive indices, and the liquid crystal lens can be equivalent to the optical lens shown in FIG. 3b.

Step 2: with the control means, making the two-dimensional display screen display a right-eye image at a second moment, and synchronously applying a second set of voltages to the liquid crystal lens, so that the right-eye image is projected through the liquid crystal lens to a right eye of the observer; a time interval between the first moment and the second moment is not more than visual persistence time of human eyes.

Figure 4A:
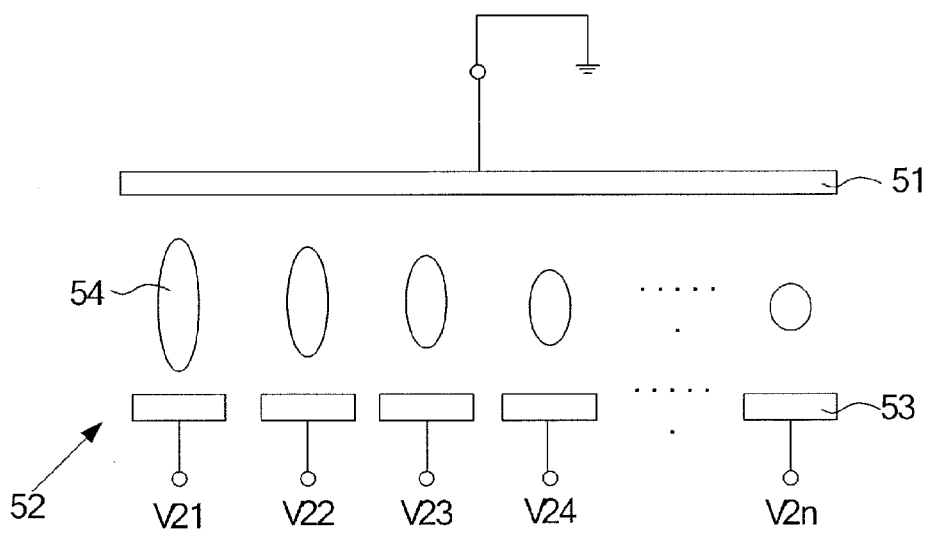
FIGS. 4a-4b are diagrams showing a principle of displaying a right-eye image in the first embodiment of the present invention.
Figure 4B:
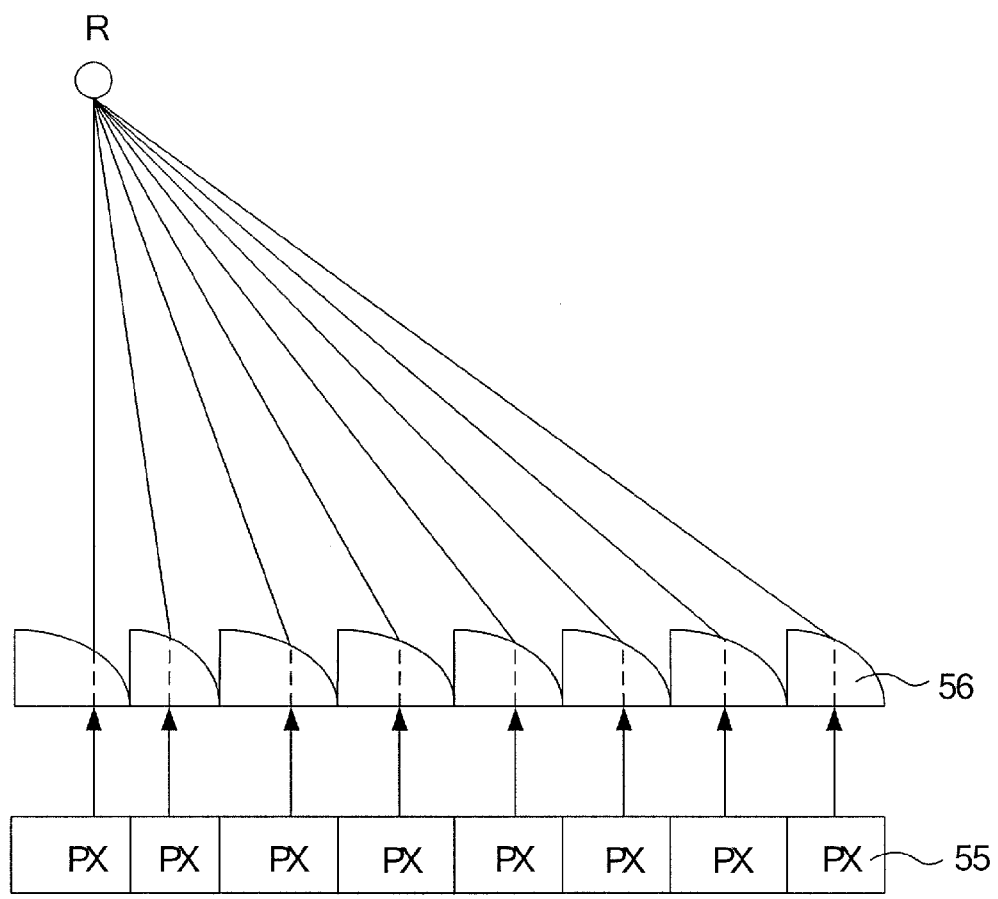

Specifically, like Step 1, as shown in FIG. 4a and FIG. 4b, the control means is used to apply a second set of voltages V21, V22, . . . V2n to the liquid crystal lens, that is, apply the voltages between the first transparent electrode 51 and each of the electrode patterns 53 of the second transparent electrode 52 of the liquid crystal lens, at a second moment; the first transparent electrode 51 is a common electrode and can be grounded, and each voltage in the second set of voltages V21, V22, . . . V2n is applied to each of the electrode patterns 53, respectively. As an example, the voltages V21-V2n are applied in a reverse sequence with respect to the voltages V11-V1n. In this embodiment, it may be set as: V21=0V, V22=2V, V23=3.5V, V24=5V, V25=7V, for example. At this time, by controlling the magnitudes of the voltages applied to each of the electrode patterns 53, the rotation angles of the liquid crystal molecules 54 in the effect of the electric fields can be controlled, so that the light emitted by each of the pixels PX' of the two-dimensional display screen 55 in FIG. 5b is refracted upon passing through the liquid crystal lens 56 and then enters into the observer's right eye R.

It should be noted that, the magnitudes of the voltages applied to different electrode sections can be adjusted according to characteristics of an actual liquid crystal lens, as long as the distribution of the refractive indices of the liquid crystal is ensured to meet the requirements of the lens.

Since at this time a right-eye image is displayed synchronously on the two-dimensional display screen 55, the right-eye image displayed on the two-dimensional display screen 55 is projected through the liquid crystal lens 56 to the right eye R of the observer. In FIG. 5b, the liquid crystal lens 56 applied with the second set of voltages V21, V22, . . . V2n has refractive indices that decrease sequentially from left to right, and according to the changes of the refractive indices, and the liquid crystal lens can be equivalent to the optical lens shown in FIG. 5b. In addition, since the time interval between the first moment and the second moment is not more than visual persistence time of human eyes, the human eyes will not perceive the transformation between the left-eye image and the right-eye image, as if the left eye and the right eye received the images almost simultaneously, thus a 3D image is formed in the observer's eyes.

In the naked-eye three-dimensional image display method provide by the embodiment of the present invention, because all pixels on a two-dimensional display screen are used to display a left-eye image or a right-eye image at a same moment, without using different pixels to display images viewed by left and right eyes, resolution reduction of a lens-type 3D display can be avoided.

The image of the two-dimensional display screen and the voltages applied to the liquid crystal lens are refreshed synchronously, and in order to achieve a better 3D display effect, the refresh frequency is preferably not less than 120 Hz.

FIG. 3a, FIG. 3b, FIG. 4a and FIG. 4b illustrate the situation that the length of the liquid crystal lens equals to the distance of two eyes of an observer, that is, the observer's two eyes are directly above two edges of the liquid crystal lens. At this time, in order to make sure that the light emitted from the two-dimensional display screen can be accurately converged to one eye of the observer, it is required that the electric-field intensities of the electric fields in the liquid crystal layer have a gradient change along the extending direction of the liquid crystal lens, so that the refractive indices of the liquid crystal lens have a gradient change.

For example, in FIG. 3a and FIG. 3b, when the electric-field intensities in the liquid crystal lens 44 are enhanced sequentially from left to right, the refractive indices are also increased sequentially from left to right, that is, the light emitted from the liquid crystal lens 44 has exit angles that decrease sequentially from left to right, and then the light enters into the observer's left-eye; in FIG. 4a and FIG. 4b, when the electric-field intensities in the liquid crystal lens 54 is weakened sequentially from left to right, the refractive indices are also decreased sequentially from left to right, that is, the light emitted from the liquid crystal lens 54 has exit angles that increase sequentially from left to right, and then the light enters into the observer's right-eye.

Certainly, the positional relationship between the liquid crystal lens and the two eyes of an observer is not limited to the situation shown in FIG. 3a, FIG. 3b, FIG. 4a and FIG. 4b, and also the distribution of the electric-field intensities is not limited to the gradient change described above; it is possible to control the distribution of the electric-field intensities in the liquid crystal layer by varying the voltages applied to the liquid crystal lens, according to an actual positional relationship.

Second Embodiment

Figure 5:
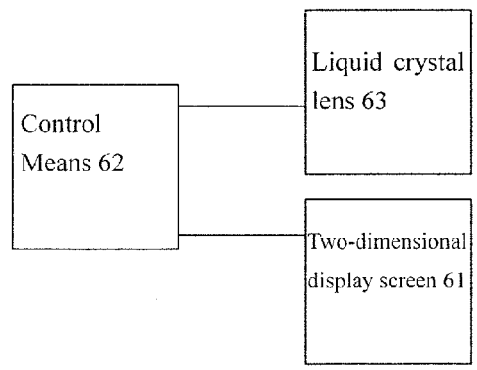
FIG. 5 is a block diagram of a naked-eye three-dimensional image display device in a second embodiment of the present invention.

This embodiment provides a naked-eye three-dimensional image display device, and the device will be described in detail as follows with reference to FIG. 5.

The naked-eye three-dimensional image display device comprises: a two-dimensional display screen 61 used for displaying a two-dimensional image, a control means 62, and a liquid crystal lens 63 located at a light-exiting side of the two-dimensional display screen. Those skilled in the art will understand that the light-exiting side refers to the side of the two-dimensional display screen for displaying an image.

The control means 62 is adapted for making the two-dimensional display screen 61 display a left-eye image at a first moment, and synchronously applying a first set of voltages to the liquid crystal lens 63, so that the left-eye image is projected through the liquid crystal lens 63 to the left eye of an observer; the control means 62 is also adapted for making the two-dimensional display screen 61 display a right-eye image at a second moment, and synchronously applying a second set of voltages to the liquid crystal lens 63, so that the right-eye image is projected through the liquid crystal lens 63 to the right eye of the observer; a time interval between the first moment and the second moment is not more than visual persistence time of human eyes.

The method that is executed by the above-described control means has been described in detail in the first embodiment, thus here it will not be redundantly described.

The image of the two-dimensional display screen and the voltages applied to the liquid crystal lens are refreshed synchronously, and in order to achieve a better 3D display effect, the refresh frequency is preferably not less than 120 Hz.

In addition, as shown in FIG. 2, the liquid crystal lens may comprise: an upper substrate, a lower substrate, and a liquid crystal layer 33 sandwiched between the two substrates 34; a first transparent electrode 31, formed on a surface of the upper substrate facing the liquid crystal layer 33 and in a shape of a continuous sheet; a patterned the second transparent electrode 32, formed on a surface of the lower substrate facing the liquid crystal layer 33 and composed of a plurality of mutually electrically-insulated electrode patterns. As described in the first embodiment, in order to make the liquid crystal lens have different refractive indices along an extending direction of the substrates 34, different voltages are required to be applied between the first transparent electrode 31 and each of the electrode patterns of the second transparent electrode 32, so that vertical electric fields with different electric-field intensities are formed between the first transparent electrode 31 and each of the electrode patterns, and thus corresponding liquid crystal molecules 35 along the extending direction of the substrates 34 have different rotation angles as shown in FIG. 2.

When the liquid crystal lens has the above-described structure, the control means is also adapted for applying each voltage in the first set of voltages or in the second set of voltages between the first transparent electrode and each of the electrode patterns of the second transparent electrode, correspondingly.

In addition, the liquid crystal lens also may have a structure as follows.

The liquid crystal lens comprise: an upper substrate, a lower substrate, and a liquid crystal layer sandwiched between the upper substrate and the lower substrate; a patterned transparent electrode, formed on a surface of the upper substrate or of the lower substrate facing the liquid crystal layer, and the transparent electrode is composed of a plurality of mutually electrically-insulated electrode patterns. As described in the first embodiment, by applying different voltages between the electrode patterns, horizontal electric fields with different electric-field intensities can be formed between the electrode patterns, and thus corresponding liquid crystal molecules along the extending direction of the substrates have different rotation angles.

When the liquid crystal lens has the above-described structure, the control means is also adapted for: applying each voltage in the first set of voltages or in the second set of voltages between the electrode patterns of the transparent electrode, correspondingly. Alternatively, the liquid crystal lens also may have a structure as follows.

The liquid crystal lens comprise: a upper substrate; a lower substrate, opposite to the upper substrate; a liquid crystal layer, sandwiched between the upper substrate and the lower substrate; a first transparent electrode and a second transparent electrode, formed on a surface of the upper substrate opposite to the lower substrate; an insulating layer, formed between the first transparent electrode and the second transparent electrode; wherein in the first transparent electrode and the second transparent electrode, the first transparent electrode, which is farther away from the liquid crystal layer, is formed as a continuous sheet, while the second transparent electrode is formed to have mutually electrically-insulated stripe-like patterns; wherein the first transparent electrode may be grounded, while each of the strip-like patterns of the second transparent electrode may be applied with different voltages, so that horizontal and vertical electric fields with different electric-field intensities can be generated along the extending direction of the two substrates, and thus corresponding liquid crystal molecules along the extending direction of the substrates have different rotation angles.

When the liquid crystal lens has the above-described structure, the control means is also adapted for: applying each voltage in the first set of voltages or in the second set of voltages between the first transparent electrode and each of the electrode patterns of the second transparent electrode, correspondingly.

Certainly, the structure of the liquid crystal lens is not limited to any of the above-described structure, and may be other structures known to those skilled in the art, in which the refractive index in each part can be changed by varying the voltages applied to the transparent electrodes.

In the various structures of the liquid crystal lens described above, the liquid crystal layer may be composed of positive nematic-phase liquid crystal, or composed of blue-phase liquid crystal. When blue-phase liquid crystal is used, relative high driving voltages are required to be provided to the transparent electrode(s).

In addition, the two-dimensional display screen may be a liquid crystal display screen, an organic-light-emitting-diode (OLED) display screen, a plasma display screen, an electronic-ink display screen, and etc. The naked-eye three-dimensional image display device may be a mobile phone, a tablet computer, a TV, a laptop, a monitor, and etc.

The above description is merely specific implementation of the invention, and the scope of the invention is not limited thereto. Within the technical scope disclosed by the present invention, modifications or substitutions which can be easily conceived by those skilled in the art who are familiar with the technical field, all should be included within the scope of the invention. Accordingly, the scope of the invention should be defined by the scope of the claims of the invention.

The invention claimed is:

1. A naked-eye three-dimensional image display method, comprising:
   with a control means, making a two-dimensional display screen display a left-eye image at a first moment, and synchronously applying a first set of voltages to a liquid crystal lens located at a light-exiting side of the two-dimensional display screen, so that the left-eye image is projected through the liquid crystal lens to a left eye of an observer; and
   with the control means, making the two-dimensional display screen display a right-eye image at a second moment, and synchronously applying a second set of voltages to the liquid crystal lens, so that the right-eye image is projected through the liquid crystal lens to a right eye of the observer;

wherein a time interval between the first moment and the second moment is not more than visual persistence time of human eyes.

2. The method according to claim 1, wherein the image of the two-dimensional display screen and the voltages applied to the liquid crystal lens are refreshed synchronously, and the refresh frequency is not less than 120 Hz.

3. The method according to claim 1, wherein the liquid crystal lens comprise:
an upper substrate;
a lower substrate;
a liquid crystal layer sandwiched between the upper substrate and the lower substrate;
a first transparent electrode, formed on a surface of the upper substrate facing the liquid crystal layer, the first transparent electrode being in a shape of a continuous sheet; and
a patterned second transparent electrode, formed on a surface of the lower substrate facing the liquid crystal layer, the second transparent electrode being composed of a plurality of mutually electrically-insulated electrode patterns.

4. The method according to claim 3, wherein applying the first set of voltages or the second set of voltages to the liquid crystal lens comprises:
applying each voltage in the first set of voltages or in the second set of voltages between the first transparent electrode and each of the electrode patterns of the second transparent electrode, correspondingly.

5. The method according to claim 1, wherein the liquid crystal lens comprise:
an upper substrate;
a lower substrate;
a liquid crystal layer sandwiched between the upper substrate and the lower substrate; and
a patterned transparent electrode, formed on a surface of the upper substrate or of the lower substrate facing the liquid crystal layer, the transparent electrode being composed of a plurality of mutually electrically-insulated electrode patterns.

6. The method according to claim 5, wherein applying the first set of voltages or the second set of voltages to the liquid crystal lens comprises:
applying each voltage in the first set of voltages or in the second set of voltages between the electrode patterns of the transparent electrode, correspondingly.

7. The method according to claim 1, wherein the liquid crystal lens comprise:
an upper substrate;
a lower substrate;
a liquid crystal layer sandwiched between the upper substrate and the lower substrate;
a first transparent electrode, formed on a surface of the upper substrate or of the lower substrate facing the liquid crystal layer, the first transparent electrode being in a shape of a continuous sheet;
a patterned second transparent electrode, formed on a same substrate as the first transparent electrode and closer to the liquid crystal layer than the first transparent electrode, the patterned transparent electrode being composed of a plurality of mutually electrically-insulated electrode patterns; and
an insulating layer formed between the first transparent electrode and the second transparent electrode.

8. The method according to claim 7, wherein applying the first set of voltages or the second set of voltages to the liquid crystal lens comprises:
applying each voltage in the first set of voltages or in the second set of voltages between the first transparent electrode and each of the electrode patterns of the second transparent electrode, correspondingly.

9. A naked-eye three-dimensional image display device, comprising:
a display screen, for displaying a two-dimensional image;
a control means; and
a liquid crystal lens, located at a light-exiting side of the display screen;
wherein the control means is adapted for making the display screen display a left-eye image at a first moment, and synchronously applying a first set of voltages to the liquid crystal lens, so that the left-eye image is projected through the liquid crystal lens to a left eye of an observer;
the control means is further adapted for making the display screen display a right-eye image at a second moment, and synchronously applying a second set of voltages to the liquid crystal lens, so that the right-eye image is projected through the liquid crystal lens to a right eye of the observer; and
a time interval between the first moment and the second moment is not more than visual persistence time of human eyes.

10. The naked-eye three-dimensional image display device according to claim 9, wherein the image of the display screen and the voltages applied to the liquid crystal lens are refreshed synchronously, and the refresh frequency is not less than 120 Hz.

11. The naked-eye three-dimensional image display device according to claim 9, wherein the liquid crystal lens comprise:
an upper substrate;
a lower substrate;
a liquid crystal layer sandwiched between the upper substrate and the lower substrate;
a first transparent electrode, formed on a surface of the upper substrate facing the liquid crystal layer, the first transparent electrode being in a shape of a continuous sheet; and
a patterned second transparent electrode, formed on a surface of the lower substrate facing the liquid crystal layer, the second transparent electrode being composed of a plurality of mutually electrically-insulated electrode patterns.

12. The naked-eye three-dimensional image display device according claim 11, wherein the control means is adapted for applying each voltage in the first set of voltages or in the second set of voltages between the first transparent electrode and each of the electrode patterns of the second transparent electrode, correspondingly.

13. The naked-eye three-dimensional image display device according to claim 9, wherein the liquid crystal lens comprise:
an upper substrate;
a lower substrate;
a liquid crystal layer sandwiched between the upper substrate and the lower substrate; and
a patterned transparent electrode, formed on a surface of the upper substrate or of the lower substrate facing the liquid crystal layer, the transparent electrode being composed of a plurality of mutually electrically-insulated electrode patterns.

14. The naked-eye three-dimensional image display device according to claim 13, wherein the control means is also adapted for applying each voltage in the first set of voltages or in the second set of voltages between the electrode patterns of the transparent electrode, correspondingly.

15. The naked-eye three-dimensional image display device according to claim 9, wherein the liquid crystal lens comprise:
   an upper substrate;
   a lower substrate;
   a liquid crystal layer sandwiched between the upper substrate and the lower substrate;
   a first transparent electrode, formed on a surface of the upper substrate or of the lower substrate facing the liquid crystal layer, the first transparent electrode being in a shape of a continuous sheet;
   a patterned second transparent electrode, formed on a same substrate as the first transparent electrode, and closer to the liquid crystal layer than the first transparent electrode, the patterned transparent electrode being composed of a plurality of mutually electrically-insulated electrode patterns; and
   an insulating layer, formed between the first transparent electrode and the second transparent electrode.

16. The naked-eye three-dimensional image display device according to claim 15, wherein the control means is also adapted for applying each voltage in the first set of voltages or in the second set of voltages between the first transparent electrode and each of the electrode patterns of the second transparent electrode, correspondingly.

17. The naked-eye three-dimensional image display device according to claim 9, wherein the liquid crystal layer in the liquid crystal lens is composed of positive nematic-phase liquid crystal, or composed of blue-phase liquid crystal.

18. The naked-eye three-dimensional image display device according to claim 9, wherein the display screen is a liquid crystal display screen, or an organic light-emitting diode display screen.

19. The method according to claim 1, wherein
   the first set of voltages is applied such that the first set of voltages include voltages having different magnitudes, and the magnitudes of the first set of voltages are controlled in order to control the rotation angle of respective liquid crystal molecules of the liquid crystal lens such that light emitted by the two-dimensional display screen is refracted upon passing through the liquid crystal lens so that the left-eye image is projected through the liquid crystal lens to a left eye of an observer, and
   the second set of voltages is applied such that the second set of voltages include voltages having different magnitudes, and the magnitudes of the second set of voltages are controlled in order to control the rotation angle of respective liquid crystal molecules of the liquid crystal lens such that light omit ed by the two-dimensional display screen is refracted upon passing through the liquid crystal lens so that the right-eye image is projected through the liquid crystal lens to a right eye of the observer.

20. The naked-eye three-dimensional image display device according to claim 9, wherein:
   the control means is adapted to apply the first set of voltages such that the first set of voltages include voltages having different magnitudes, and the magnitudes of the first set of voltages are controlled in order to control the rotation angle of respective liquid crystal molecules of the liquid crystal lens such that light emitted by the display screen is refracted upon passing through the liquid crystal lens so that the left-eye image is projected through the liquid crystal lens to a left eye of an observer, and
   the control means is adapted to apply the second set of voltages such that the second set of voltages include voltages having different magnitudes, and the magnitudes of the second set of voltages are controlled in order to control the rotation angle of respective liquid crystal molecules of the liquid crystal lens such that light emitted by the display screen is refracted upon passing through the liquid crystal lens so that the right-eye image is projected through the liquid crystal lens to a right eye of the observer.

* * * * *